United States Patent [19]

Saito

[11] Patent Number: 4,984,185
[45] Date of Patent: Jan. 8, 1991

[54] PORTABLE COMPUTER HAVING A BATTERY VOLTAGE DETECTING CIRCUIT

[75] Inventor: Yuichi Saito, Ome, Japan

[73] Assignee: Kabushiki Kaisha Toshiba, Kanagawa, Japan

[21] Appl. No.: 530,458

[22] Filed: May 30, 1990

Related U.S. Application Data

[63] Continuation of Ser. No. 368,957, Jun. 13, 1989, abandoned, which is a continuation of Ser. No. 116,799, Nov. 5, 1987, abandoned.

[30] Foreign Application Priority Data

Nov. 7, 1986 [JP] Japan .................... 61-171030[U]

[51] Int. Cl.⁵ .................................................. G06F 1/00
[52] U.S. Cl. ...................................................... 364/707
[58] Field of Search ................ 364/707; 324/433; 340/635, 636

[56] References Cited

U.S. PATENT DOCUMENTS 3,979,657  9/1976  Yorksie ........................... 340/636
4,517,517  5/1985  Kinney ............................ 324/433
4,571,690  2/1986  Munetsugu ....................... 364/707
4,660,027  4/1987  Davis ............................... 324/433
4,907,183  3/1990  Tanaka ............................ 364/707

FOREIGN PATENT DOCUMENTS 58-72266  4/1983  Japan ............................... 364/707

Primary Examiner—Dale M. Shaw
Assistant Examiner—Long T. Nguyen
Attorney, Agent, or Firm—Finnegan, Henderson, Farabow, Garrett and Dunner

[57] ABSTRACT

A portable computer having a battery used as a main power source, a load which is variable, and a battery-voltage detecting circuit for detecting the output voltage of the battery. A plurality of predetermined voltage values is set in the battery-voltage detecting circuit. One of these voltage values is selected in accordance with the condition of the load, and is compared with the output voltage of the battery. It can therefore be accurately determined, regardless of the variation of the load, whether or not the power remaining in the battery is sufficient.

7 Claims, 8 Drawing Sheets

PORTABLE COMPUTER HAVING A BATTERY VOLTAGE DETECTING CIRCUIT

This application is a continuation of application Ser. No. 07/368,957, filed June 13, 1989, now abandoned, which is a continuation of application Ser. No. 07/116,799, filed Nov. 5, 1987 now abandoned.

BACKGROUND OF THE INVENTION

This invention relates to a portable or hand-held apparatus having a battery as a main power source, and more particularly, to a circuit for an apparatus which consumes a varying current during operation, for checking the battery voltage of the apparatus, irrespective of the load variation of the apparatus.

Portable and hand-held apparatuses are being used in increasing numbers. Most apparatuses of this type are provided with a batteries for main power sources. In some types of personal computers and word processors, the batteries are used to drive mechanical units such as a floppy disk drive (FDD) and a printer. As is known, these mechanical units consume tens to hundreds of times more current than the electric components of the apparatuses. The power remaining in the battery is often insufficient for normal operation of the mechanical units after a long use of the electric components. Hence, the remaining power must be and actually is detected before the mechanical unit are driven.

FIG. 8 shows a conventional battery-voltage check circuit incorporated in a battery-driven, portable or hand-held apparatus. This circuit detects the remaining power of a battery, in terms of the voltage between the terminals of the battery. When this voltage (hereinafter referred to as "output voltage") falls below a reference value, it is determined that the power remaining in the battery is inadequate. Even if the battery-voltage check circuit determines that sufficient power is left in the battery since the load is rather light, the out- put voltage of the battery may drops below the reference value, due to the internal resistance of the battery when a mechanical unit is driven and, hence, the load increases. Consequently, the mechanical unit can no longer operate normally. The probability is high that such a voltage drop will cause a FDD to make errors in writing data.

FIG. 9 represents the discharge characteristic of a dry cell. Generally, the reference voltage set in the battery-voltage check circuit is slightly higher than the minimum voltage which can correctly drive the load provided within the battery-driven apparatus. This is because a back-up operation, such as writing data on a disk inserted in the FDD, must be performed as soon as the check circuit detects an insufficiency of power. At point A on the light-load characteristic line (FIG. 9), the power remaining in the dry cell is slightly greater than the reference value. When the load suddenly increases, the check circuit detects an insufficiency of power, as is indicated by point B on the heavy-load characteristic line (FIG. 9). Since point B is far below the horizontal line representing the reference value of the output voltage of the dry cell, the load can no longer operate normally.

FIG. 10 shows the discharge characteristic of a Ni-Cd battery (secondary battery). When the Ni-Cd battery is used, the same problem arises as in the case of using the dry cell having the discharge characteristic shown in FIG. 9. In addition, the battery-voltage check circuit detects an insufficiency of power before the Ni-Cd battery is used up. Since the user replaces the battery with a new one when the check circuit detects the power insufficiency, the power left in the battery will be wasted.

SUMMARY OF THE INVENTION

The object of the present invention is to provide a portable, battery-driven apparatus, in which a load current changes by tens to hundreds of times, and which has a battery-voltage detecting circuit for reliably detecting the output voltage of a battery.

According to the invention, there is provided a portable, battery-driven apparatus having a battery-voltage detecting circuit. The battery-voltage detecting circuit comprises at least two comparing means for comparing the power remaining in a battery with a reference value; selecting means for selecting one of the comparing means in accordance with the load of the apparatus; and display means for displaying the results of the comparison performed by the comparing means selected by the selecting means.

BRIEF DESCRIPTION OF THE DRAWINGS

Other objects and features of the present invention will be apparent from the following description taken in connection with the accompanying drawings, in which.

DETAILED DESCRIPTION OF THE PREFERRED EMBODIMENT

Figure 1:
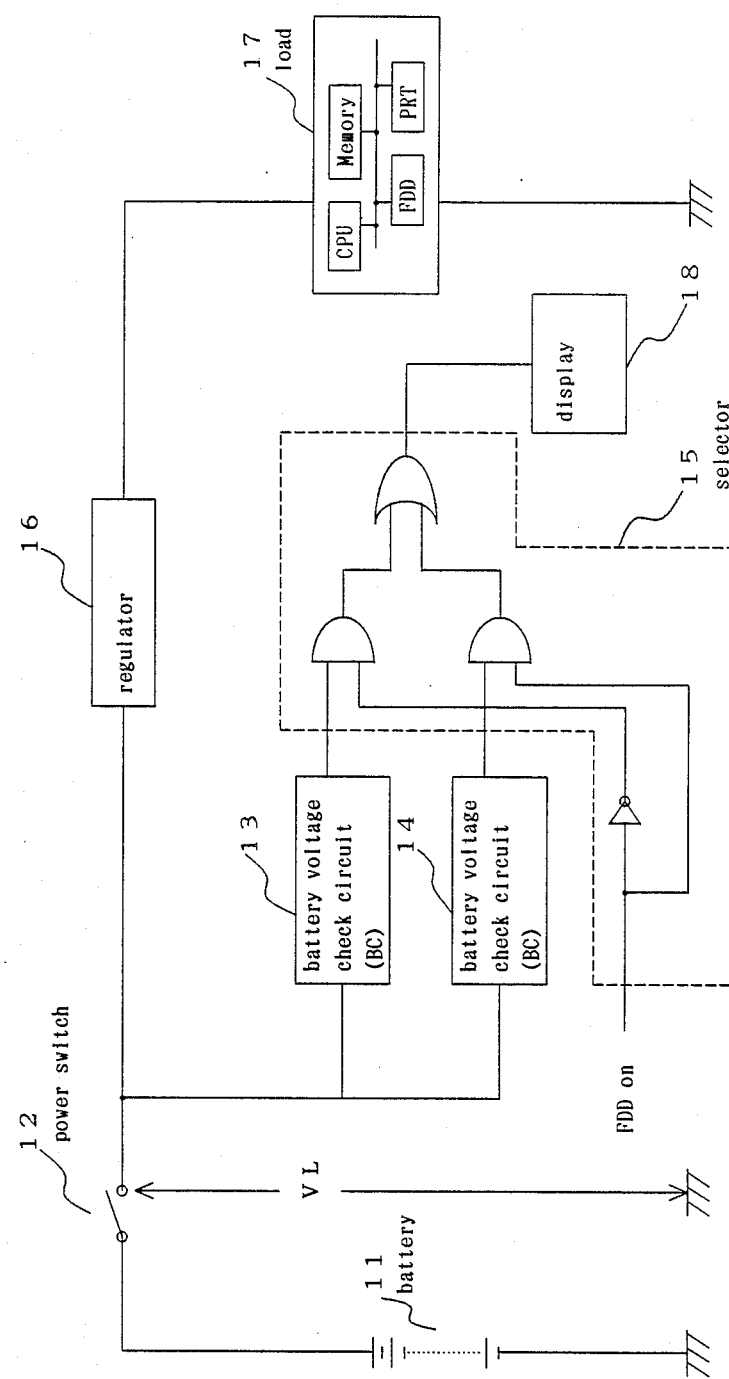
FIG. 1 is a block diagram showing a battery-voltage detecting circuit according to one embodiment of this invention.

A first embodiment of the present invention will be described with reference to the accompanying drawings. As is shown in FIG. 1, one terminal of battery 11 (primary/secondary) is connected to the ground, whereas the other terminal of this battery is connected to the movable contact of power switch 12. Two battery-voltage check circuits 13 and 14 are provided. Circuit (BC) 13 is designed to detect the power remaining in battery 11 while battery 11 is driving a light load. Circuit (BC) 14 is designed to detect the power remaining in battery 11 while battery 11 is driving a heavy load. Selector 15 is connected to both battery check circuits 13 and 14 for selecting the output of circuit 13 or 14. The output of selector 15 is used as an FDD-start signal (FDD on) or a printer-start signal (PRT on).

Regulator 16 is connected, at one end, between the inputs of both battery-voltage check circuits 13 and 14, and at the other end, to load 17 which comprises a logic circuit, a FDD, a printer, and the like. Regulator 16 is used to reduce the changes of the power-source voltage resulting from a load variation. The logic circuit comprises a CPU (Central Processing Unit), a volatile memory, an input/output port. Display 18 is connected to selector 15, for displaying the value of the remaining power of battery 11, which circuit 13 or 14 has detected.

Figure 3:
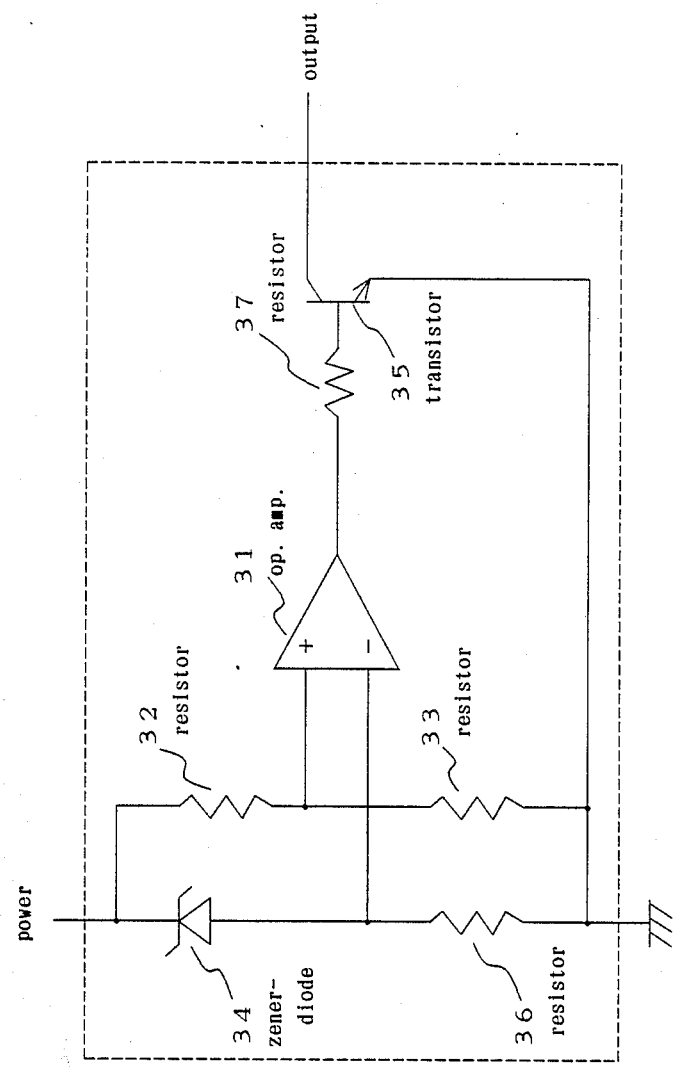
FIG. 3 is a circuit diagram of the battery-voltage check circuits used in the circuit of FIG. 1.

Battery-voltage check circuits 13 and 14 have the same structure, which is illustrated in FIG. 3. As is shown in this figure, either battery-voltage check circuit comprises operational amplifier 31. Amplifier 31 generates a high-level signal when its positive (+) and negative (−) input terminals receive a high-level signal and a low-level signal, respectively. Conversely, it produces a low-level signal when its positive (+) and negative (−) input terminals receive a low-level signal and a high-level signal. The battery-voltage check circuit further comprises four resistors 32, 33, 36 and 37, zener diode 34, and transistor 45. The ratio between the resistances of resistors 32 and 33, and the rated value of zener diode 34 determine the value for the output of amplifier 31. Transistor 35 is turned on or off, according to the output of operational amplifier 31, to output a signal representative of the difference between the two signals input to amplifier 31. Resistors 36 and 37 protect the battery-voltage check circuit.

Assume that power switch 12 is on, no mechanical units are driven, and the current flowing through load 17 is thus small. In this condition, selector 15 outputs a low-level signal, whereby battery-voltage check circuit 13 is selected. On the other hand, when any mechanical unit is driven, and the current flowing via load 17 is thus large, selector 15 outputs a high-level signal, whereby battery-voltage check circuit 14 is selected.

Figure 2:
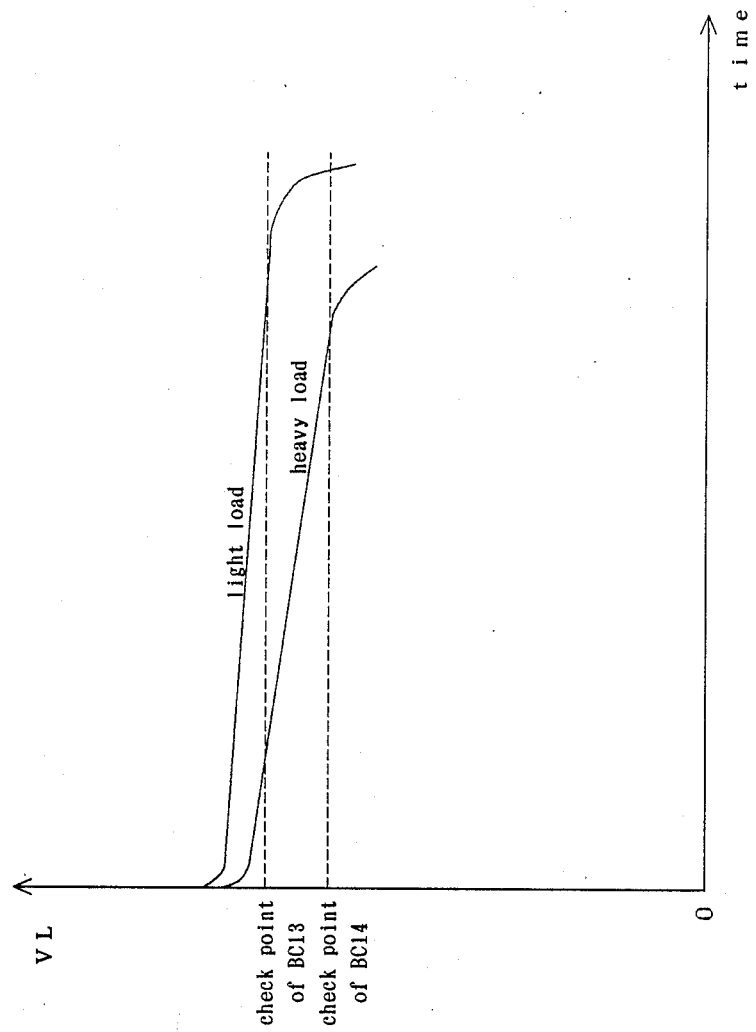
FIG. 2 is a graph representing the discharge characteristic of the battery, the output voltage of which is detected by the circuit shown in FIG. 1.
Figure 8:
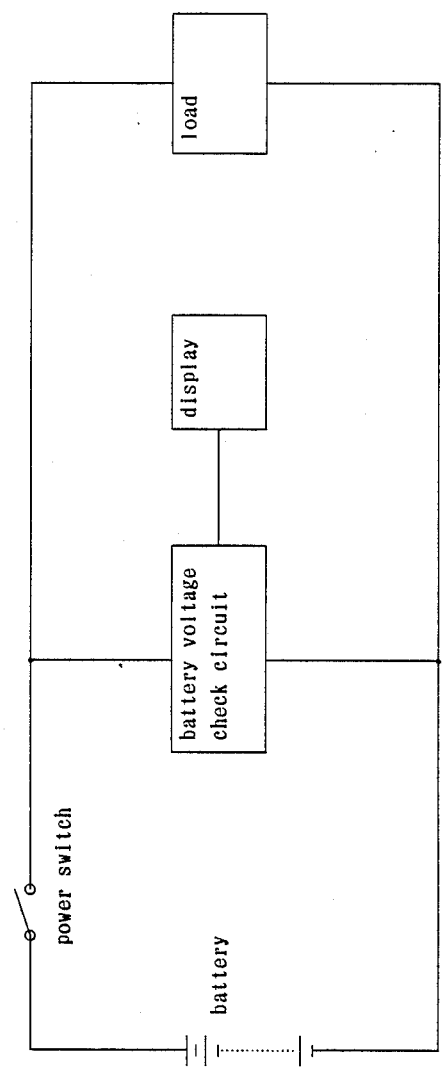
FIG. 8 is a block diagram showing a conventional battery-voltage detecting circuit.
Figure 9:
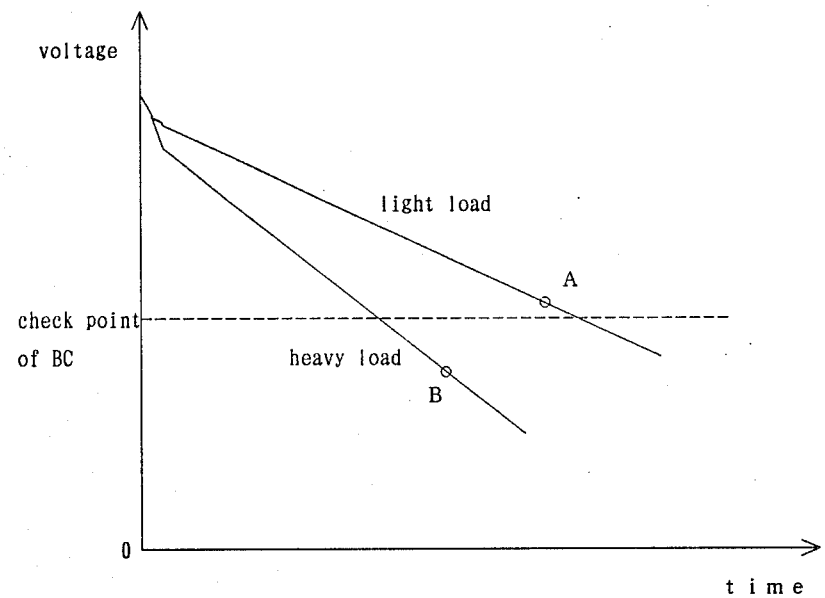
FIG. 9 is a graph showing the discharge characteristic of a dry cell.
Figure 10:
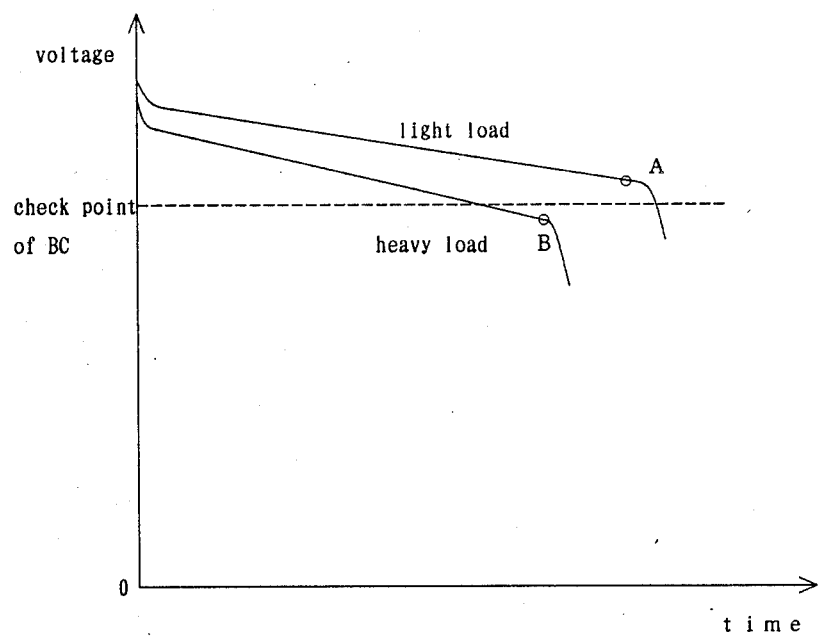
FIG. 10 is a graph illustrating the discharge characteristic of a Ni-Cd battery.

As has been described, circuit 13 is designed to detect the power remaining in battery 11 while battery 11 is driving a light load, whereas circuit 14 is designed to detect the power while battery 11 is driving a heavy load. More specifically, a higher reference voltage is set in circuit 13 than in circuit 14, as is shown in FIG. 2. As may be understood from FIG. 2, the reference voltage set in circuit 13 is higher than that set in the conventional check circuit (FIG. 8), whereas the reference voltage set in circuit 14 is lower than that set in the conventional check circuit. In other words, the reference voltage set in the conventional check circuit (FIG. 8) is between the two reference voltages used in the present invention.

The output of selector 15 represents that the output voltage of battery 11 is lower than the value set in check circuit 13 or the value set in check circuit 14. That is, this output shows that the power remaining in battery 11 is insufficient. It is input to display 18, which displays a message "Remaining Power Insufficient," thus informing a user that the power left in battery 11 is inadequate. (Display 18 is comprised of LEDs, a buzzer, and some other components.) The user then supplies data to the FDD, thus recording it on the disk (nonvolatile memory) inserted in the FDD, or stops the printer PRT.

Alternatively, the output of selector 15 is input to a control circuit (not shown) for controlling load 17, whereby the printer RPT is automatically prohibited from operating, or data is automatically supplied to the FDD and eventually recorded on the disk (nonvolatile memory) inserted in the FDD.

Battery-voltage check circuit 13 produces a signal when the output voltage of battery 11 falls below the reference value set in circuit 13 while none of the mechanical units included in load 17, such as the FDD and the printer PRT, is being operated. This signal is selected by selector 15 and supplied to display 18. Similarly, battery-voltage check circuit 14 produces a signal when the output voltage of battery 11 falls below the reference value set in circuit 14 while any of the mechanical units included in load 17, such as the FDD and the printer PRT, is being operated. The output signal of circuit 14 is selected by selector 15 and supplied to display 18.

The embodiment of FIG. 1 and 2 has two circuits, one for detecting whether or not the output voltage of the battery has fallen below a first reference value while battery 11 is driving a light load, and the other for detecting whether or not this voltage has fallen below a second reference value while battery 11 is driving a heavy load. Battery 11 can drive the load even if the load changes to have three or more values, only by using three or more battery-voltage check circuits and two or more selectors for selecting the output of one of these check circuits.

In the embodiment of the present invention, as has been mentioned, various reference voltages corresponding to the various values the load may have can be set and compared with the output voltage of the battery has fallen below any one of these reference voltages, thus accurately detecting whether or not the power left in the battery is insufficient. Since a power insufficiency can be reliably detected, the data being processed in the portable apparatus can be readily recorded in a nonvolatile memory, e.g., a disk inserted in the FDD, and the power supply to the printer can be prohibited. In addition, since no power insufficiency is detected when the power remaining in the battery is adequate, there is no possibility that the mechanical units, such as the FDD and the printer, are unnecessarily stopped.

Another embodiment of the present invention will now be described with reference to FIG. 4. As is shown in this figure, switch 42 is provided which is operated during the driving of a light load. One terminal of battery 41 (primary/secondary) is connected to the ground, whereas the other terminal of this battery is connected to the movable contact of power switch 43. Switch 42 is a circuit made of semi-conductor elements. Its one end is connected to the ground, and its other end is coupled to resistor 44 for supplying a maximum current from battery 41 to load 47. Battery-voltage check circuits 45 is provided for detecting whether or not the output voltage of battery 41 is below a predetermined reference value. Flip-flop 46 is connected to check circuit 45, for storing the output of circuit 45. More precisely, flip-flop 46 is set by the output signal of circuit 45 which represents that the power remaining in battery 41 is insufficient. Load 47, which comprises a logic circuit, a FDD, a printer, and the like, is connected to regulator 48 for reducing the changes of the power-source voltage resulting from a load variation.

Figure 7:
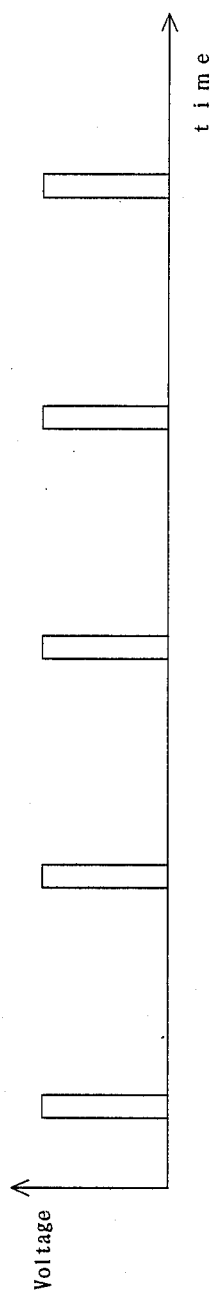
FIG. 7 is a diagram showing the waveforms of the pulse signals output by the pulse generating circuit shown in FIG. 6.
Figure 6:
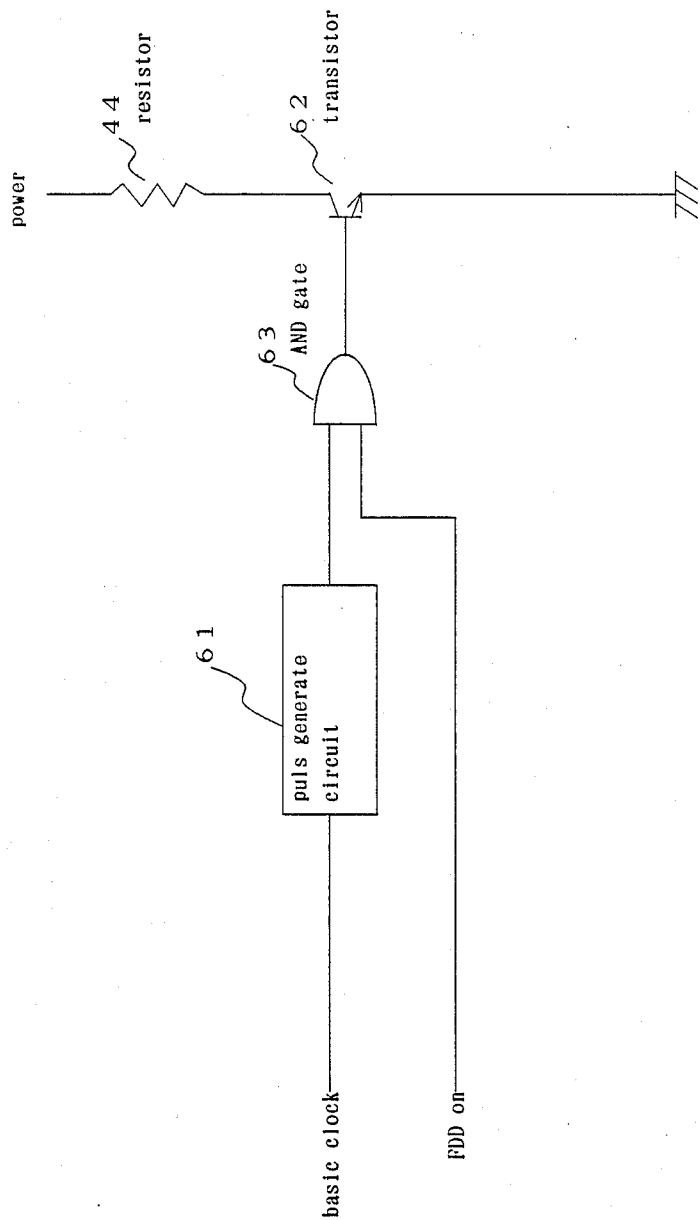
FIG. 6 is a circuit diagram of switch S1 used in the circuit of FIG. 4.

As is shown in FIG. 6, switch 42 comprises pulse generating circuit 61, transistor 62, and two-input AND gate 63. Circuit 61 receives a clock signal and generates a pulse signal (FIG. 7). Transistor 62 is turned on or off by the pulse output from pulse generating circuit 61, thus functioning as a switch. AND gate 63 controls pulse generating circuit 61 in accordance with a signal for starting a mechanical unit, e.g., signal FDD on. Hence, switch 42 is turned on only while battery 41 is driving a light load. Resistor 44 has such a resistance that it supplies a current corresponding to a heavy load.

Figure 4:
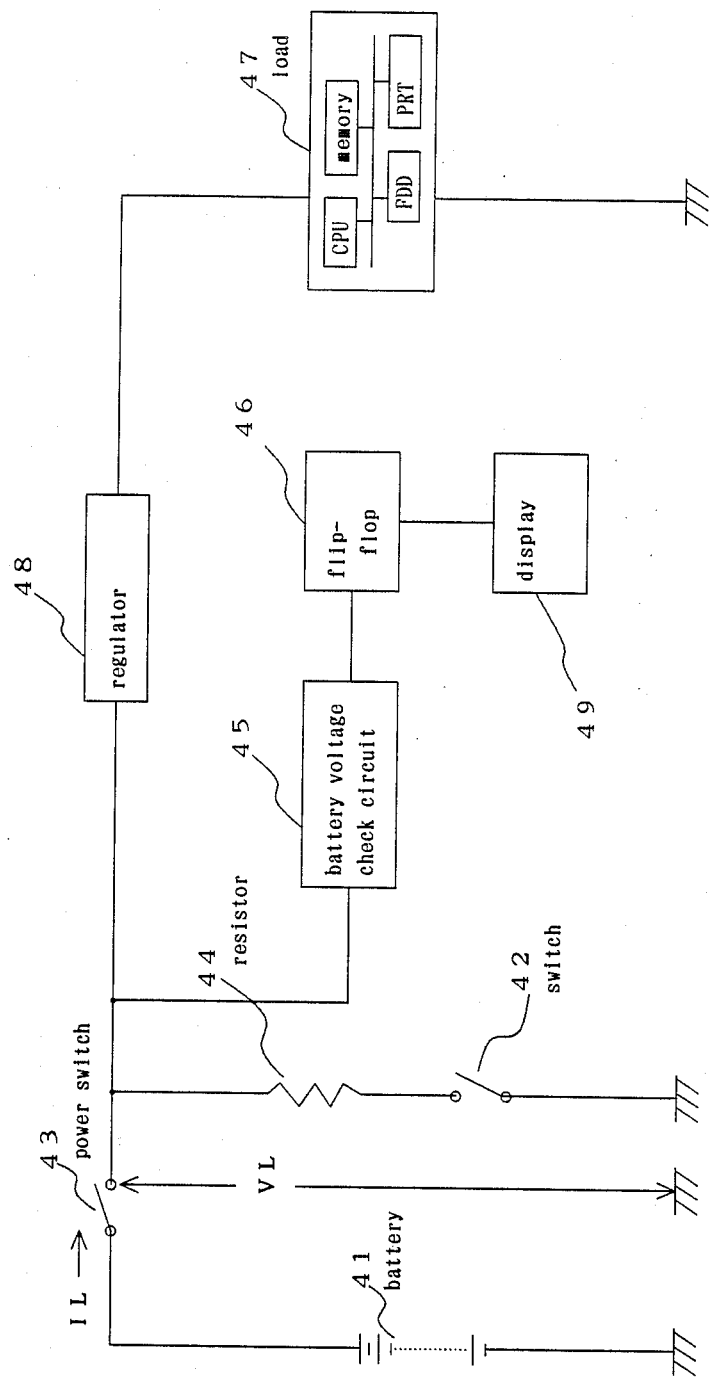
FIG. 4 is a block diagram showing a battery-voltage detecting circuit according to another embodiment of the present invention.
Figure 5:
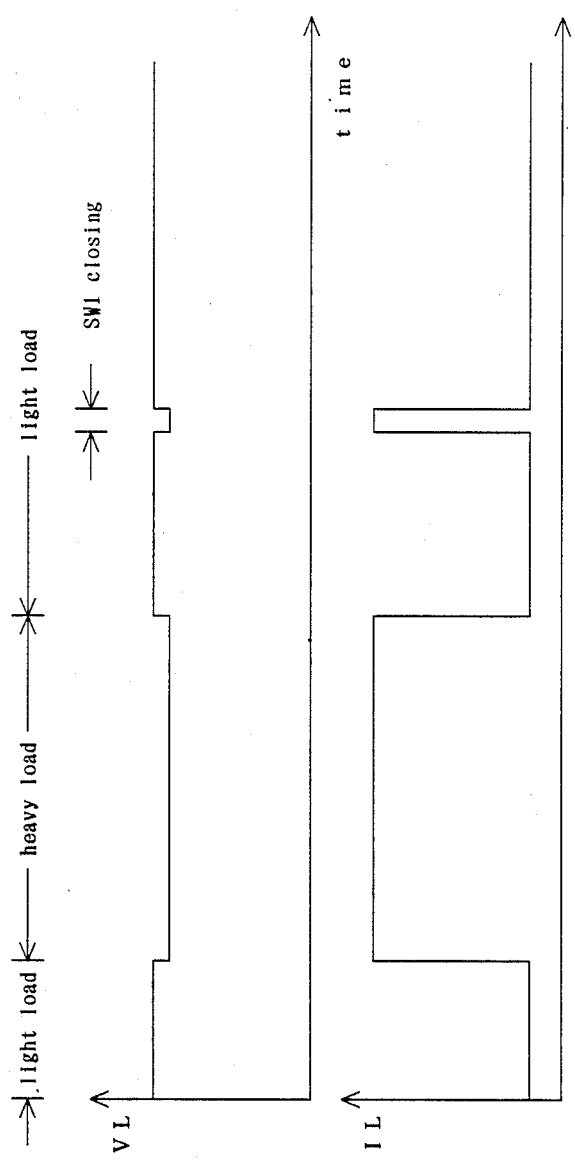
FIG. 5 is a timing chart explaining the operation of the circuit shown in FIG. 4.

FIG. 5 is a timing chart illustrating the operation of the embodiment shown in FIG. 4. When power switch 43 is on, and no mechanical units are driven, the current flowing through load 47 is small. In this condition, switch 42 is on, and the current corresponding to the heavy load therefore can flow through resistor 44. Due to the resistance of resistor 44, the output voltage (VL) of battery 41 drops. If this voltage remains above the reference value set in battery-voltage check circuit 45, no signal representative of a power insufficiency is output. If the voltage has fallen below the reference value, a signal showing the power insufficiency is output, whereby flip-flop 46 is set. The set output of flip-flop is supplied to display 49. Display 49 displays a message informing the user that the power remaining in battery 41 is insufficient. The user then supplies data to the FDD included in load 47, thus recording it on the disk (nonvolatile memory) inserted in the FDD, or stops the printer included also in load 47.

Alternatively, the set output of flip-flop 46 is input to a control circuit (not shown) for controlling load 47, whereby the printer is automatically prohibited from operating, or data is automatically supplied to the FDD and eventually recorded on the disk inserted in the FDD.

Switch 42 is turned on for as short a period as possible (e.g., about 1ms) at so long intervals as possible (10 to 100s), so that the power consumption of the portable apparatus may not increase greatly. Assume that 10mA and 2A are required to drive a light load and a heavy load, respectively. Then, when switch 42 is on for 2ms at intervals of 10s, the current used up by closing switch 42 will be 2A × (1ms/10sdD) = 0.2mA. The increase in current, which is required for operating switch 42, will be only 1% (={0.2mA/2-0mA}×100).

As has been described, in either embodiment the present invention, it can be determined, by simulation, whether the power left in a battery is sufficient or not for driving a heavy load, while the power of the battery is being used to drive a light load. An insufficiency of battery power can be reliably detected, and thus the printer can be prohibited from operating, or data can be supplied to the FDD and then recorded on the disk inserted in the FDD.

What is claimed is:

1. A system for detecting the condition of a battery power source of a battery powered apparatus having a first type of component operative when energized to draw a first current value, and a second type of component operative when energized to draw a second current value substantially greater than the first current value, said system comprising:
    first circuit checking means responsive to the drawing of a current value corresponding to the first current value for generating a first output signal at times when the battery voltage is less than a first predetermined reference voltage;
    second circuit checking means responsive to the drawing of a current value corresponding to the second current value for generating a second output signal at times when the battery voltage is less than a second predetermined reference voltage substantially lower than the first reference voltage;
    display means responsive to a selected one of the first and second output signals for indicating the condition of the battery power source; and
    selecting means governed by a load value corresponding to the electrical load across the battery power source for selecting one of the first and second output signals.

2. The system of claim 1, wherein the first predetermined reference voltage is a threshold level substantially corresponding to the minimal battery power required for operating the first type of component.

3. The system of claim 1, wherein the second predetermined reference voltage is a threshold level substantially corresponding to the minimal battery power required for operating the second type of component.

4. The system of claim 1, wherein the second type of component is rendered inoperative at times when the selecting means selects the second output signal.

5. The system of claim 1, wherein at least one of the first and second types of component includes a nonvolatile data storage device, and the first and second predetermined reference voltages each having a level sufficiently high to permit the displayed condition of the battery power source to be transferred to the nonvolatile data storage device at times when the battery voltage is less than the respective first and second predetermined reference voltage.

6. A system for detecting the condition of a battery power source of a battery powered apparatus having a first type of component operative when energized to draw a first current value, and a second type of component operative when energized to draw a second current value substantially greater than the first current value, said system comprising:
    first circuit checking means including a series connected resistance and switching means connected across the battery powered source operative to draw periodically a predetermined electrical load at times when the first type of component is energized and the second type of component is deenergized, said predetermined electrical load corresponding to the second current value;
    second circuit checking means responsive to the predetermined electrical load and the second current value for generating an output signal at times when the battery voltage is less than a predetermined reference voltage;
    display means responsive to the output signal for indicating the condition of the battery power source for the continued operation of either type of energized component.

7. The system of claim 6, wherein at least one of the first and second types of component include a nonvolatile data storage device, and the predetermined reference voltage having a level sufficiently high to permit the displayed condition of the battery power source to be transferred to the non-volatile data storage device at times when the battery voltage is less than the respective first and second predetermined reference voltage.

* * * * *